INVENTORS
David A. Russell
Chester F. Cynoski
BY [signature]
ATTORNEY

INVENTORS
David A. Russell
Chester F. Cynoski
BY [signature]
ATTORNEY

INVENTORS
David A. Russell
Chester F. Cynoski
BY [signature]
ATTORNEY

United States Patent Office 3,458,608
Patented July 29, 1969

1

3,458,608

METHOD OF MANUFACTURING HIGH STRENGTH STRUCTURES HAVING CELLULAR CORES

David A. Russell, Wilbraham, Mass., and Chester F. Cynoski, Thompsonville, Conn., assignors to Monsanto Company, St. Louis, Mo., a corporation of Delaware Filed July 19, 1966, Ser. No. 566,371
Int. Cl. B29h *7/20;* B32b *7/02*
U.S. Cl. 264—45 9 Claims

ABSTRACT OF THE DISCLOSURE

A resinous material is subjected to a foaming medium to effect a partial absorption of the medium into the body of the resin. This is followed by heat treating the modified resin to develop an integral foam surface thereon under heat and pressure, releasing the pressure to allow expansion of the composite structure and then recompressing the resin composite to form an integral resinous body wherein voids are essentially eliminated and the cells are subdivided and oriented in elongated form normal to the solid portion of the resinous body.

Figure 1:
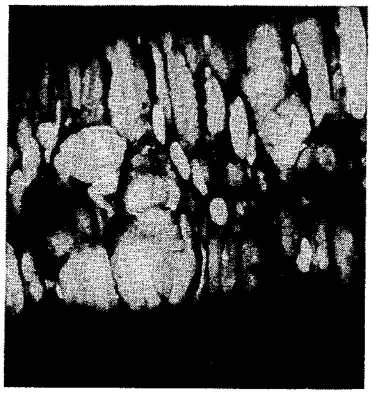

This invention relates to a novel method for preparing cellular core structures. The application of Edgar E. Hardy and David A. Russell, Ser. No. 272,540, filed Apr. 12, 1963, now Patent No. 3,262,625, describes and claims a plastic article of manufacture having an improved combination of insulating and structural characteristics composed of a partially foamed thermoplastic material. The process in that application broadly involves (1) shaping a solid plastic form, (2) steeping the plastic form in a medium absorbable by the plastic for a predetermined interval of time, removing the plastic form from the medium and finally heating the plastic to produce a foamed covering at the area of contact with the absorbable medium which extends partially into the solid plastic form. The resultant plastic article of manufacture has a surprisingly improved combination of insulating and structural characteristics wherein the insulating or foamed layer is integrally attached to the solid substrate which gives structural strength to the combination. Application Ser. No. 548,905, filed May 10, 1966 by the same inventors, describes and claims a sandwich structure comprising a laminate formed by exposing a plastic surface to a medium absorbable by the plastic for a predetermined interval of time, intimately contacting at least a portion of said surface with a second plastic surface and subjecting the resulting assembly to elevated temperatures to partially foam the first plastic element of the combination and at the same time integrally attach the same to the inner surface of the second plastic element in the combination.

It has been observed in the structures of the inventions described in the aforesaid applications that at minimum cycles, structures made by partial steeping and foaming often give coarse cells and large voids in the cellular composition of the foam. It has been discovered in accordance with the invention that without increasing the total cycle time voids can be essentially eliminated and cell structure improved by a multiple expansion of the partially foamed plastic articles. Furthermore, it has been also found in accordance with the invention that greatly improved internal cellular formations may be produced with a very substantial reduction in the cycle time.

2

A primary object of the invention is accordingly to effect a very substantial improvement in physical properties of synthetic resin composite structures formed by partial foaming procedures wherein a resinous material is subjected to a foaming medium for a predetermined period of time to effect a partial absorption of the medium into the body of the resin, followed by heat treatment of the modified resin to develop an integral foam surface thereon under heat and pressure, releasing the pressure to allow expansion of the composite structure and then recompressing the resin composite from an integral resinous body wherein voids are essentially eliminated and the cells are sub-divided and oriented in elongated form normal to the solid portion of the resinous body.

It has been observed that in the multiple re-expansion procedure set forth above that coarse cells and large voids are essentially eliminated and the cells become more elongated and oriented in a direction perpendicular or normal to the unfoamed surface of the resin. Preferably, during the ordinary heat treatment described in the aforementioned applications (near the end of the normal cycle), the pressure is released to a predetermined set opening and the system is allowed to expand. For example, the expansion allowed between successive stages of pressure may be sufficient to allow the material to expand from about 10 to 100 percent of the final thickness. This will depend largely upon the type of thermoplastic material being handled in the process and the qualities desired in the final end product. This intermediate expansion period may be followed by further application of pressure to recompress the partially foamed plastic article to any desired extent ranging from about 10 to 100 percent of the initial thickness of the original foam thickness.

Figure 2:
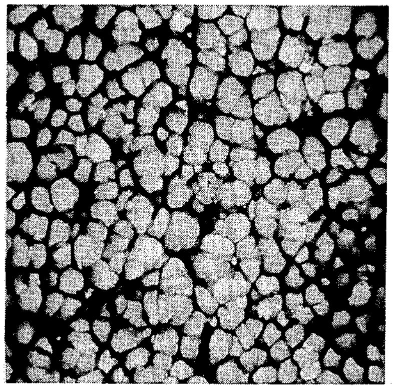
Figure 3:
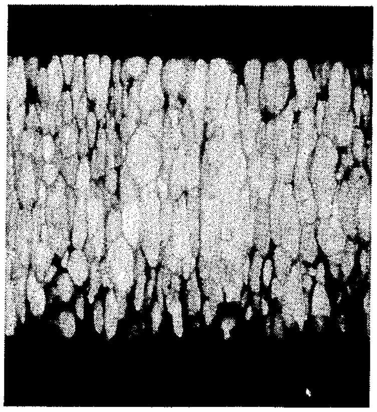
Figure 4:
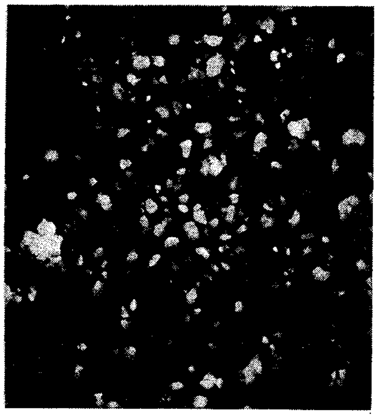

Referring to the drawings, it will be observed that FIGURE 1 illustrates in elevation the orientation of cell structure produced by the normal partially steeping procedure while FIGURE 2 shows a plan view of how these cells appear from above. FIGURE 3 is an elevation of the modified foam area showing detailed cell orientation of a partially steeped thermoplastic resin prepared in accordance with the invention. FIGURE 4 is a plan view from above similar to FIGURE 2 of the cell structure produced wherein the cells are virtually oriented in accordance with the procedure of the invention.

Figure 5:
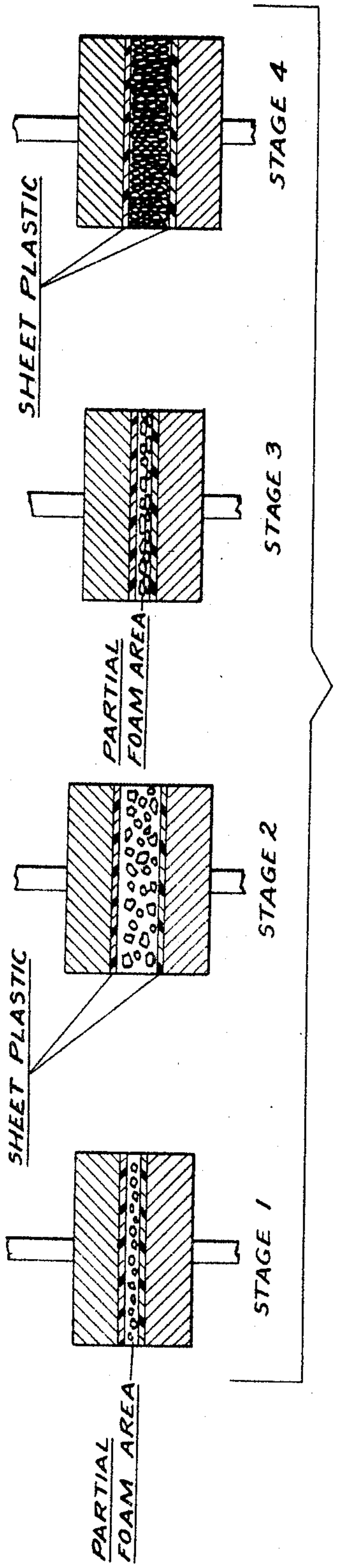
Figure 6:
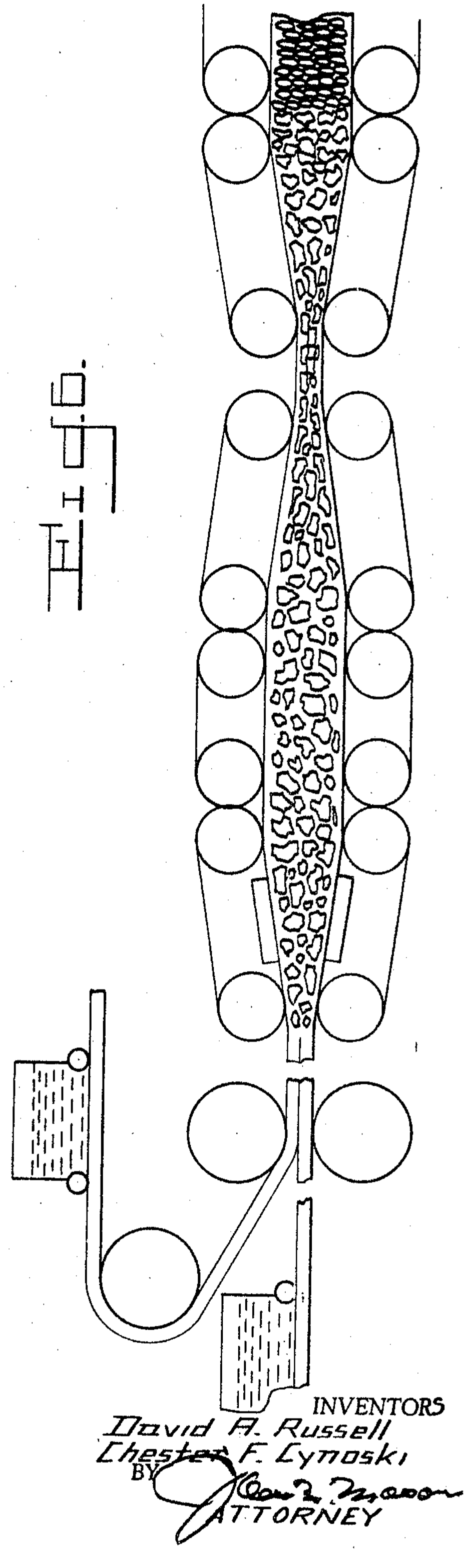

FIGURE 5 shows the stepwise compression of a two-ply, internally partially foamed sandwich structure for purposes of illustration. It can be understood, of course, that the principles of the invention are likewise applicable to the formation of sandwich structures comprising three or more plies of partially foamed resinous materials in multiple compression procedures. Stage 1 signifies the compression and partial foaming of the sandwich structure containing the pneumatogen. Stage 2 shows the withdrawal of the compression members to allow expansion of the partially foamed construction to any desired extent. Stage 3 shows the recompression of the partially foamed and expanded structure while Stage 4 illustrates the further withdrawal of the compression members to allow expansion of the internal partially foamed structure, and, as can be seen, the elongation and orientation of the cell structure in a direction essentially normal toward the opposite faces of the sandwich construction. This can be followed, of course, with succeeding expansion and recompression stages to any extent desired to produce special effects in the finished article. FIGURE 6 shows the recompression procedure of my invention applied as a continuous process, wherein the pneumatogenic agent is applied, in this instance, to the internal faces of the thermoplastic so that the said reagent is absorbed into the interior of the opposing faces of the sandwich structure. It is shown in the continuous process illustrated by FIGURE 6 the heating, by flat plates, applied to opposing sides of the so-treated laminate results in a random arrangement of the internal cells in the partially foamed construction wherein voids and irregularities exist as illustrated graphically in FIGURES 1 and 2 of the drawings. In this continuous process, the partially foamed continuous sheet or strip of the sandwich structure is subjected to recompression which distorts the cells. This is followed by an expansion zone, shown at the right of the drawing, wherein the cells become oriented essentially into parallel elongated relationship normal to the opposite faces of the sandwich.

Figure 7:
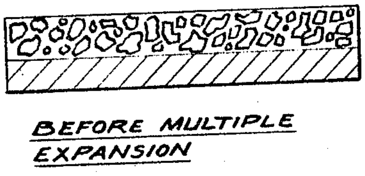
Figure 8:
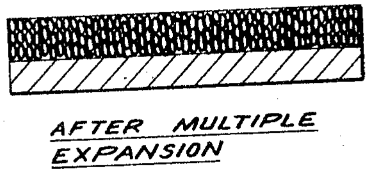
Figure 9:
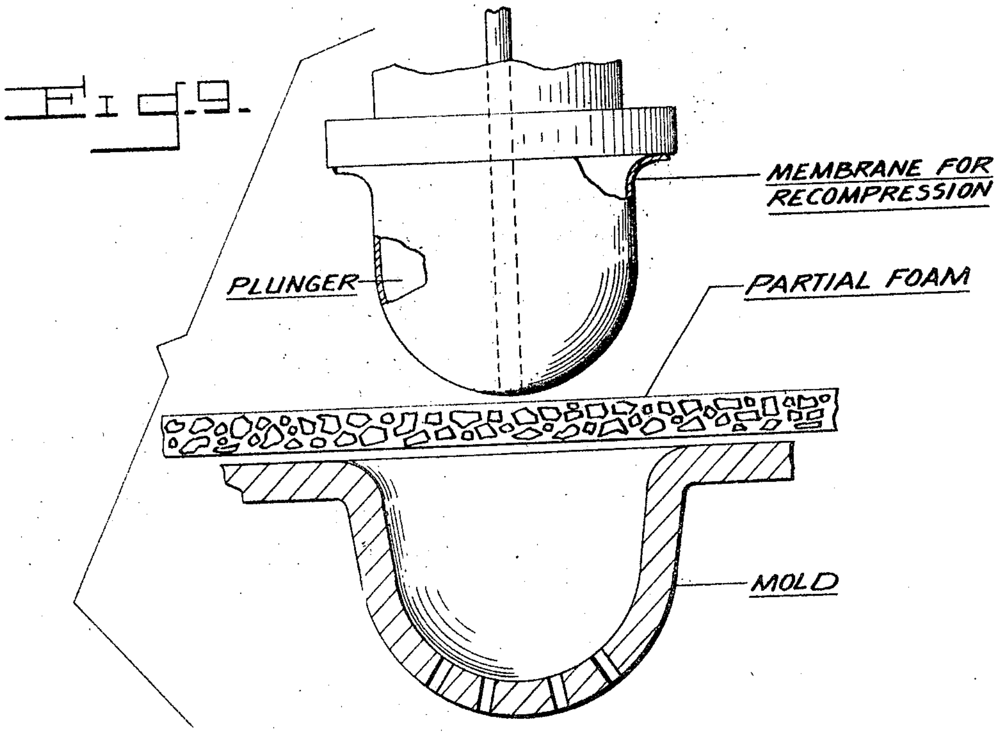
Figure 10:
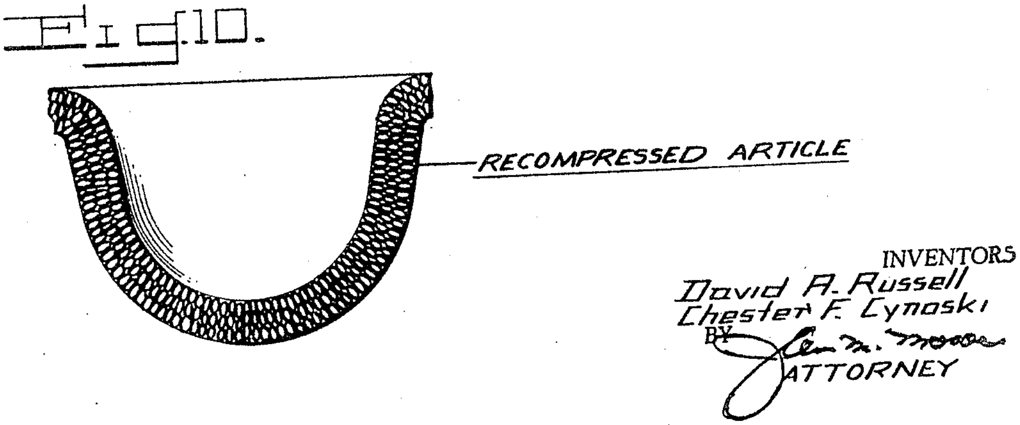

FIGURES 7 and 8 show the invention as applied to a single ply of thermoplastic resin which may be formed, for example, as described in the Hardy and Russell application, Ser. No. 272,540, now Patent No. 3,262,625, aforementioned as shown in FIGURE 7. In the latter case, the initial partial foaming may be effected by a partial steeping of the thermoplastic resinous article following heat treatment then followed by a period of expansion and further followed by compression by application of pressure as previously described in connection with a two-ply partially foamed sandwich construction. The arrangement that will be observed from FIGURE 8 is essentially similar to that illustrated by Stage 4 of FIGURE 5 and by the last stage of expansion in the continuous process illustrated in FIGURE 6 of the drawings, except that the recompression is applied to a structure where one side only has been partially foamed. FIGURE 9 shows a membrane for recompressing an irregular shaped object, while FIGURE 10 is the recompressed irregular shaped object itself.

As described in the Hardy and Russell applications, Ser. Nos. 272,540, now Patent No. 3,262,625 and 548,905, the invention is applicable virtually to any thermoplastic material amenable to the partial steeping procedure including but not limited to styrene homopolymers, rubber modified styrene polymer blends, PVC homopolymers, acrylonitrile-butadiene-styrene terpolymers, mechanical polyblends and other modified graft and mechanically blended styrene polymers, vinyl halide, vinylidene halide, vinyl acetate, cellulose ester, ethyl cellulose, acrylic acid esters, methacrylic acid esters, acrylonitrile, ethylene, propylene and higher olefins, isobutylene, halogenated olefins, as well as copolymers, interpolymers, graft polymers, and chlorinated and chlorosulfonated polymers of the monomers corresponding to the above-mentioned polymeric products and mixtures of the same. A particularly useful material for forming articles such as containers is a rubber-modified polystyrene or polystyrene which preferably has incorporated therein a rubber compound grafted onto the molecule. Another particularly useful material is a terpolymer polyblend system of acrylonitrile, butadiene and styrene. It is not necessary that both of the opposing sheets be of the same material. In most instances, structures having unusual properties can be obtained by contacting sheet materials of different compositions to obtain the needed properties resulting from the combination of the two compositions. Carried further, it is also possible to join more than two members, each of which can be of different composition if desired to produce structures having unusual property combinations. Generally, when more than two sheet members are involved in the structure, the center member has both sides or surfaces in the foamed state. In fact, the internal sheet member may be either partially or entirely foamed.

The medium which is absorbable by the plastic is considered to be any material which is (1) absorbable by the plastic being processed and (2) convertible to a gaseous state at a temperature below 150° F. above the softening temperature of the plastic. Preferably, the medium will contain or be a solvent for the plastic and may possibly include a non-solvent to regulate or slow the rate of absorption and/or partial solution of the plastic. For the sake of clarification, the term "solvent" also includes those materials in which the plastic is considered slightly soluble. The intent in the choice of the medium is to utilize materials which after exposure to the plastic will cause the plastic to foam on the subsequent application of heat.

The choice of the medium which may be employed will depend primarily on the type of plastic material which is to be steeped. For example, ethylene oxide or dichlorofluoromethane is considered quite suitable for the acrylonitrile-butadiene-styrene terpolymers while trichlorofluoromethane is less desirable. On the other hand, trichlorofluoromethane is considered quite suitable for polystyrene homopolymers and rubber modified polystyrene interpolymers. Among the solvents which find application in the present process, there may be listed trichlorofluoromethane, sulphur dioxide, dichlorofluoromethane, methylene chloride, ethylene oxide, methyl formate, butadiene, acetone, dichloroethylene, carbon tetrachloride, dichlorofluoromethane, methyl sulfide, methyl ethyl ketone, benzol, chloroform and the like. Among the materials which sometimes find utility as non-solvents or solvents depending on the type of plastic, there may be included methanol, ethanol, n-pentane, isopentane, hexane and the like.

The exposure of the plastic to the medium generally requires only a few seconds to a few minutes for optimum absorption depending for the most part on the depth of foam desired, the type of medium used, and the respective temperatures of the medium and plastic article. In general, the time of exposure to the medium is directly proportional to the square root of the depth of absorption into the plastic. The time of exposure then will always be less than that which would result in complete absorption throughout the plastic layer. As previously indicated, this operation may be carried out by any suitable method such as immersion of the plastic article in a liquid medium or even by subjecting the plastic article to solvent vapors in a vessel which may or may not be pressurized.

In general, the plastic structure is aged a short interval of time between contact and heating to allow deeper diffusion of the medium within the depth of the plastic material. If desired, the temperature of the material may be elevated somewhat to increase the rate of diffusion. On the other hand, if the temperature is increased significantly, it may be desirable to increase the pressure on the opposing sheets to prevent premature expansion.

After this aging interval, the plastic assembly is heated to foam the steeped portions of the member(s). The heating means utilized may vary and the final results being affected by the uniformity of heating, rate of heating and temperature level at which it is conducted.

The products of this invention are formed from substantial thermoplastic materials. The structures which may be fabricated from the practice of this invention are especially useful for panel applications requiring high insulating characteristics and good structural properties. In addition, the panel members are light-weight and have a variety of uses in the building trade. Furthermore, the panel members themselves can be heated and molded to produce a variety of shapes such as cups, containers, boat hulls, enclosures, structural members, etc.

EXAMPLE I

A cellular core structure is prepared by exposing one side of each of two 48" wide x 96" long x 0.072" thick sheets of acrylonitrile; butadiene; styrene (35:15:30) material, molecular weight (Staudinger) equals 80,000 to dichloromonofluoromethane for 15 seconds after which the exposed surfaces of both sheets are placed in contact in a press under a force applied equal to 350 p.s.i. This pressure is maintained at a temperature of 240° F. for 9 minutes and 30 seconds after which the press is opened gradually to a total distance of 0.30" measured between press plate surfaces. When the foam has expanded fully, the full pressure is again applied for 15 seconds. The press is allowed to open to the set .30" and the panel is cooled and removed. Inspection of the finished part discloses unfoamed top and bottom layers having a total thickness of approximately 0.060" and a cellular core approximately 0.180" thick and 9 lbs./cu. ft. in density. Examination of the cells indicates that for the most part they are columnar with the long axis extended generally perpendicular to the plate of the composite.

A second structure is prepared similarly to the first structure with the exception of the original pressure cycle is maintained for 10 minutes, the press is allowed gradually to expand to 0.30" measured between press platens. Inspection discloses a structure similar to the above but of more irregular and coarser cell size.

Both the recompressed cellular core structure and the normal laminate are subjected to a series of compression tests producing an average test result of 400 p.s.i. for the recompressed cellular cored structure and 250 for the normal laminate. In other words, a significant improvement in compression strength is attained. Furthermore, shear and bending tests indicate that improvements in these respective properties are also obtained on the recompressed cellular core structure when compared in relation to the normal laminate.

EXAMPLE II

The procedure of Example I is repeated except that styrene homopolymer molecular weight (Staudinger) equals 90,000, is used in place of the acrylonitrile; butadiene; styrene material of Example I and the material is exposed to trichlorofluoromethane for a period of 60 seconds as opposed to exposing the material to dichloromonofluoromethane for 15 seconds and subsequent multiple expansion employed. Substantial improvements similar to those of Example I are obtained.

As indicated above, the multiple compressed cellular core structures of the present invention are superior in terms of compression bending and sheer strength properties over the normal structure which are prepared according to the previous methods described. Furthermore, no discontinuity is noted in the transition area between the unfoamed portions of the cellular cored structure as would be evident in the normal sandwich structures.

Although the above examples, for illustrative purposes, describe the preparation of sandwich structures, the invention is likewise applicable to reorientation of cell structure in partially foamed thermoplastic materials wherein the pneumatogenic material is applied to a single surface of the thermoplastic substrate as described in the Russell and Hardly application, Ser. No. 272,540. Also, the invention contemplates the initial preparation of a partially foamed panel structure either in sandwich form or with a single foam surface and the panel structure then is subsequently subjected to recompressive treatment to produce a variety of shapes and wherein during the establishment of such shapes the foaming is completed as the said panels conform to the contours of the mold.

Regarding the equipment used to carry out the present process, all that is essential is that a volatile medium which is absorbed by the plastic be allowed to contact the surface of the plastic for predetermined length of time and a source of heat to expand the member and a source of pressure to allow the multiple expansion procedure. FIGURE 2 illustrates a bottomless chamber containing a liquid volatile substance which is held in the chamber by the sheet passing in contact with the chamber bottom. It is, of course, obvious that other means may be used such as vapor, coating methods and even folding the sheet to retain a pool of liquid during this step.

What is claimed is:

1. A method of manufacturing structures having cellular cores which comprise exposing at least one surface of a thermoplastic surface to a material which is (1) absorbable by the plastic being processed and (2) convertible to a gaseous state at a temperature below 150° F. above the softening temperature of the plastic, for an interval of time less than that which would result in complete absorption throughout the plastic layer, intimately contacting at least a portion of said surface with a second plastic surface, placing the resulting assembly in confining means designed to control the rate of foam expansion, subjecting said resulting assembly to a temperature between the gas transition temperature of the medium which is absorbable by the plastic and a temperature which is 150° F. above the softening temperature of the plastic, allowing the plastic exposed to the absorbable material to expand, thereby forming a plastic structure having an internal cell structure, reapplying said confining means to the assembly while subjecting said assembly to a temperature between the gas transition temperature of the medium and a temperature which is 150° F. above the softening temperature of the plastic, then releasing the plastic structure from the confining means, thereby yielding a plastic structure having a subdivided and reoriented internal cell structure.

2. A method of manufacturing structures having cellular cores and at least one solid surface which comprises exposing one solid surface of a thermoplastic article to a material which is (1) absorbable by the plastic being processed and (2) convertible to the gaseous state at a temperature below 150° F. above the softening temperature of the plastic for an interval of time less than that which would result in complete absorption throughout the plastic layer to partially foam said surface, allowing expansion of said partially foamed surface to a thickness of from about 10 to 100 percent of the final thickness, applying pressure to said article to compress said partially foamed surface to an extent of about 10 to 100 percent of the initial thickness of said partially foamed surface, releasing said pressure and allowing expansion of said partially foamed surface to the extent desired in the finished article.

3. A method as set forth in claim 2, wherein the medium absorbable by the plastic is trichlorofluoromethane.

4. A method as set forth in claim 2 wherein the medium absorbable by the plastic is dichloromonofluoromethane.

5. A method as set forth in claim 2 wherein the medium absorbable by the plastic is a mixture of a solvent and a non-solvent for the plastic.

6. The method according to claim 2 wherein the solid plastic form is an insulating and structural panel.

7. The method according to claim 2 wherein the solid plastic form is an insulating panel.

8. The method according to claim 2 wherein the solid plastic form is a structural panel.

9. A method for producing a foamed surface on styrene-based polymer articles which comprises the steps of (1) shaping a solid plastic form,
(2) steeping the plastic form in a medium absorbable by the plastic and convertible to the gaseous state at a temperature below 150° F. above the softening temperature of the plastic until said medium is absorbed partly through the plastic,
(3) removing the plastic form from said medium,
(4) heating the plastic form to produce a foamed covering having an internal cell structure at the area heated which had been in contact with said medium,
(5) applying pressure to the foam covering,
(6) releasing said pressure, and
(7) allowing expansion of foamed covering to the extent desired in the finished article thereby reorienting the internal cell structure at a direction normal to said surface.

References Cited

UNITED STATES PATENTS

| | | | |
|---|---|---|---|
| 2,769,205 | 11/1956 | Pfleumer | 264—55 |
| 3,082,483 | 3/1963 | Bickford | 264—321 |
| 3,238,565 | 3/1966 | Jacobs | 264—321 XR |
| 3,262,625 | 7/1966 | Russell et al. | 264—53 XR |

FOREIGN PATENTS

| | | |
|---|---|---|
| 591,621 | 1/1960 | Canada. |

PHILIP E. ANDERSON, Primary Examiner

U.S. Cl. X.R.

114—.5; 161—160, 161; 220—83; 229—3.5; 264—47, 53, 55, 321